US011030287B2

(12) United States Patent
Obaidi

(10) Patent No.: US 11,030,287 B2
(45) Date of Patent: Jun. 8, 2021

(54) USER-BEHAVIOR-BASED ADAPTIVE AUTHENTICATION

(71) Applicant: T-Mobile USA, Inc., Bellevue, WA (US)

(72) Inventor: Ahmad Arash Obaidi, Tracy, CA (US)

(73) Assignee: T-MOBILE USA, INC., Bellevue, WA (US)

( * ) Notice: Subject to any disclaimer, the term of this patent is extended or adjusted under 35 U.S.C. 154(b) by 222 days.

(21) Appl. No.: 16/003,039

(22) Filed: Jun. 7, 2018

(65) Prior Publication Data

US 2019/0377853 A1 Dec. 12, 2019

(51) Int. Cl.
*G06F 21/31* (2013.01)
*G06F 21/36* (2013.01)
*G06F 21/32* (2013.01)
*G06N 20/00* (2019.01)

(52) U.S. Cl.
CPC ............ *G06F 21/316* (2013.01); *G06F 21/32* (2013.01); *G06F 21/36* (2013.01); *G06N 20/00* (2019.01)

(58) Field of Classification Search
CPC ........ G06F 21/316; G06F 21/32; G06F 21/31; H04L 63/0861
See application file for complete search history.

(56) References Cited

U.S. PATENT DOCUMENTS

| | | | | |
|---|---|---|---|---|
| 8,892,461 | B2* | 11/2014 | Lau | G06Q 30/0269 705/14.66 |
| 9,185,095 | B1* | 11/2015 | Moritz | H04L 63/0861 |
| 9,807,611 | B2* | 10/2017 | Takenouchi | G10L 17/22 |
| 9,813,402 | B1* | 11/2017 | Chen | G06F 21/316 |
| 10,289,819 | B2* | 5/2019 | Stavrou | G06F 21/316 |
| 10,354,252 | B1* | 7/2019 | Sahar | G06Q 20/3224 |
| 10,397,209 | B2* | 8/2019 | Hwang | H04L 63/08 |
| 10,540,979 | B2* | 1/2020 | Visser | G10L 15/22 |
| 2009/0210722 | A1* | 8/2009 | Russo | H04L 9/0866 713/189 |
| 2011/0282785 | A1* | 11/2011 | Chin | G06F 21/32 705/42 |
| 2012/0214442 | A1* | 8/2012 | Crawford | G06F 21/316 455/411 |
| 2014/0250510 | A1* | 9/2014 | Shuster | H04L 63/1416 726/6 |

(Continued)

*Primary Examiner* — James R Turchen
(74) *Attorney, Agent, or Firm* — Han Santos, PLLC

(57) ABSTRACT

The use of user-behavior-based adaptive authentication may provide more secure user authentication without sacrificing user convenience. A baseline behavior pattern of a user may be identified using a machine learning algorithm based on user behavior data collected by one or more applications on at least one user device of the particular user for a predetermined time period. One or more events that deviate from the baseline behavior pattern of the user during a specific time period are then detected using the machine learning algorithm based on new user behavior data of the user obtained during the specific time period. In response to receiving a request from an application to authenticate a particular user for access or continued access to a resource, an authentication question and a correct answer for the authentication question are generated based on a detail of an event that deviates from the baseline behavior pattern.

16 Claims, 9 Drawing Sheets

(56) References Cited

U.S. PATENT DOCUMENTS

| | | | | |
|---|---|---|---|---|
| 2014/0372423 A1* | 12/2014 | Majumder | .......... | G06F 16/9535 |
| | | | | 707/725 |
| 2015/0301796 A1* | 10/2015 | Visser | .................. | G10L 15/22 |
| | | | | 715/728 |
| 2015/0356316 A1* | 12/2015 | Thompson | .......... | G06F 21/6245 |
| | | | | 726/28 |
| 2016/0021081 A1* | 1/2016 | Caceres | ................ | G06F 21/32 |
| | | | | 726/7 |
| 2016/0232726 A1* | 8/2016 | Zizi | ...................... | G07C 13/00 |
| 2016/0300049 A1* | 10/2016 | Guedalia | .............. | G06F 21/316 |
| 2017/0078262 A1* | 3/2017 | Riddick | ................. | G06F 21/31 |
| 2017/0289168 A1* | 10/2017 | Bar | .................. | H04L 63/0853 |
| 2017/0330165 A1* | 11/2017 | Banerjee | ............. | H04L 63/107 |
| 2018/0124105 A1* | 5/2018 | Rodrigues | ........... | G06Q 50/265 |
| 2018/0288063 A1* | 10/2018 | Koottayi | ................ | H04L 63/102 |
| 2019/0095596 A1* | 3/2019 | Manganelli | ............ | G06F 21/31 |
| 2019/0281048 A1* | 9/2019 | Dong | .................. | G06F 16/535 |

* cited by examiner

USER-BEHAVIOR-BASED ADAPTIVE AUTHENTICATION

BACKGROUND

Consumers have access to multiple smart devices that make their lives easier and more enjoyable. These smart devices may include smartphones, home voice user interface (VUI) devices, and vehicle VUI devices. A consumer may use a smartphone to make voice calls, check email and text messages, update social media pages, stream media, browse websites, check weather and traffic, and so forth. The consumer may use a home VUI device to control home automation, obtain news and entertainment, request information and trivia, keep in touch with their friends, play games, and so forth. Likewise, the consumer may use a vehicle VUI device to activate or deactivate vehicle functions, check traffic patterns, navigate to destinations, and so forth. Thus, consumers are becoming more comfortable with the idea of sharing their verbal communications and user behavior information with smart devices and service providers that provide backend functionalities for the smart devices.

At the same time, applications on such smart devices and other user devices that enable consumers to access web-hosted or cloud-hosted resources generally require consumers to authenticate their identities prior to granting access to such resources. Biometric-based authentication has made it easier for consumers to authenticate themselves to access management services that control access to such resources. For example, instead of memorizing an ever-increasing number of user names and passwords, consumers can simply use their unique biometric characteristics to access the resources. However, biometric authentication, such as fingerprint verification or facial recognition, is still susceptible to being compromised or fooled by nefarious techniques.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
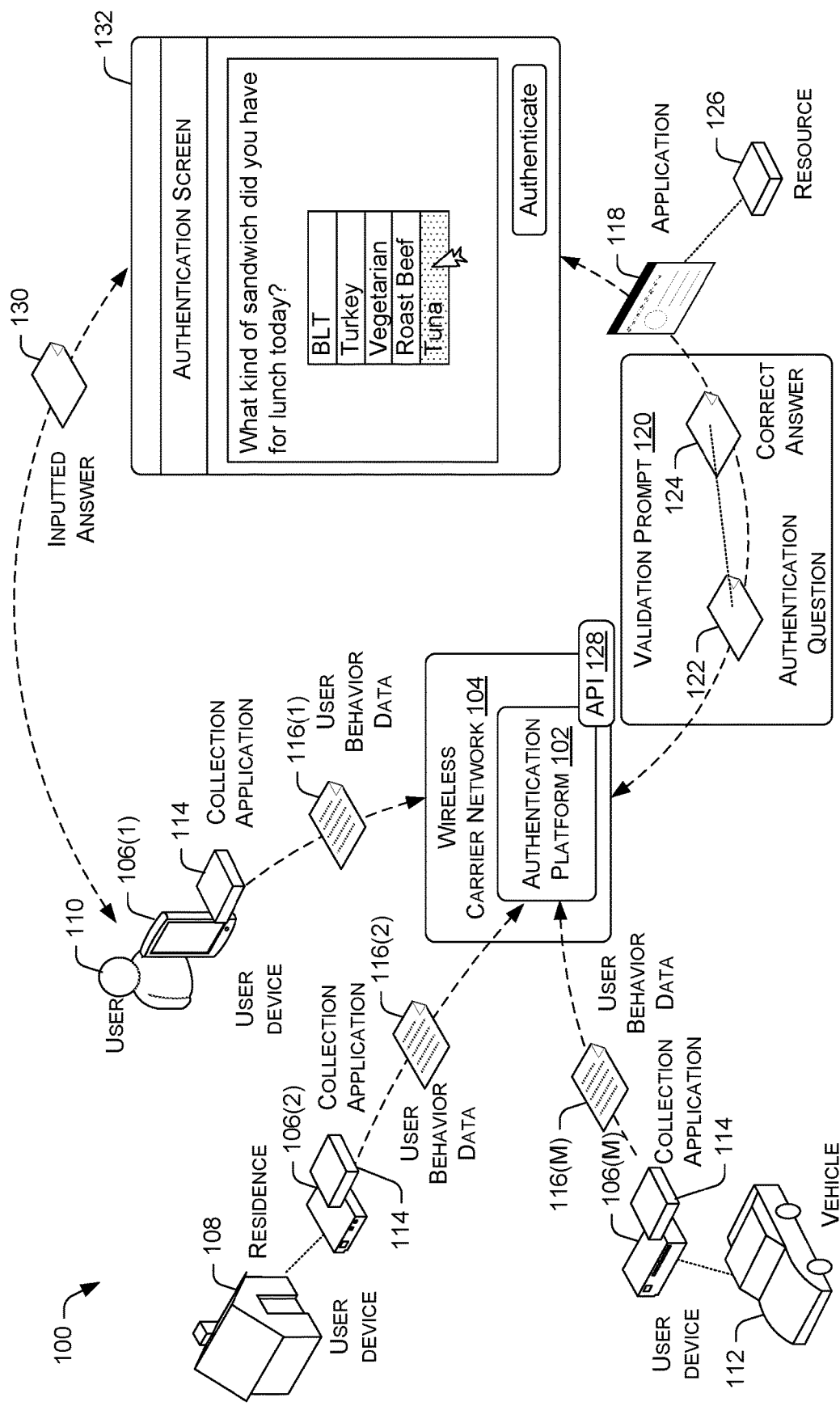
FIG. 1 illustrates an example architecture for providing user-behavior-based adaptive authentication to a user.

This disclosure is directed to techniques for providing an authentication platform that adaptively authenticates a user based on user behavior data collected by user devices of the user. The user devices may include a smartphone of the user, a home smart device of the user, a vehicle smart device of the user, and/or so forth. The user behavior data of the user that is collected by the user devices may include verbal communication. For example, the verbal communication may include conversations of the user with another party (whether in-person or during a telecommunication call), user utterances of the user, and spoken user commands of the user to other applications installed on the user device. The user behavior data may further include user application inputs and data collected by the sensors of a user device. The user application inputs may include key or gesture inputs to applications that are installed on the user device. For example, the user inputs may include an address inputted into a navigation application, a selection of a city in a weather application, a note or message that is inputted by the user into a notation application, an event that is inputted into a calendar application, purchase patterns of the user in online shopping applications, and/or so forth. The data collected by the sensors of the user device may include Global Positioning System (GPS) geolocation data, camera image or video data, compass reading data, accelerometer data, etc.

The user behavior data are collected by a collection application installed on each user device of the user after the user has explicitly granted permission for the collection of user behavior data by the application. Such permission-based data collection is designed to protect the user privacy of the user. The collection applications on the user devices may transmit the user behavior data to the authentication platform. In turn, the authentication platform may use the user behavior data of the user that is collected over a predetermined time period to learn a baseline behavior pattern of the user. Subsequently, as the authentication platform receives additional user behavior data during a following specific time period, the authentication platform may detect one or more events that deviate from the baseline behavior pattern of the user during the specific time period.

Accordingly, when the authentication platform receives a request for adaptive authentication of the user from an application, the authentication platform may generate an authentication question and a correct answer for the authentication question based on a detail of an event that deviated from the baseline behavior pattern of the user. In various embodiments, the application may request adaptive authentication by calling an application program interface (API) of the authentication platform. For example, the API may be an operating system API, a remote API, a web API, etc. In this way, the authentication platform may handle the adaptive authentication of the user in conjunction with the application.

During the adaptive authentication, the authentication platform may send a validation prompt that includes the authentication question to the application for presentation to the user. The authentication question may prompt the user to input an answer to the authentication question. Subsequently, the authentication platform may compare an answer that is inputted by the user with the correct answer to the authentication question. Thus, if the inputted answer matches the correct answer, the authentication platform may provide an indication to the application that the user is authenticated. Otherwise, if the inputted answer does not match the correct answer, the authentication platform may provide an indication to the application that the user is not authenticated. In turn, the application may take the appropriate action in response to the indication, such as granting the user access to a resource if the user is authenticated. Conversely, the application may deny the user access to the resource if the user is not authenticated.

In various embodiment, adaptive authentication based on user behavior data may be used to supplement or replace other forms of user authentication, such as authenticating a user using user-inputted authentication credentials or user biometric data. The use of adaptive authentication based on user behavior data may provide an additional layer of security as such authentication is not reliant on persistent authentication credentials or biometric information that are vulnerable to hacking, duplication, cloning, and/or theft. Instead, adaptive authentication relies on the use of user behavior data that constantly changes as the user goes about his or her daily life. The techniques described herein may be implemented in a number of ways. Example implementations are provided below with reference to the following figures.

Example Architecture

FIG. 1 illustrates an example architecture 100 for providing user-behavior-based adaptive authentication to a user. The user-behavior-based adaptive authentication may be performed by an authentication platform 102 that is operated by a wireless carrier network 104. The wireless carrier network 104 may provide a wide range of mobile communication services, as well as ancillary services and features, to subscribers and associated mobile device users. The wireless carrier network 104 may be implemented using multiple interconnected networks. In various embodiments, the wireless carrier network 104 may include multiple Radio Access Networks (RANs). The RANs may be connected to each other via regional ground networks. In turn, the regional ground networks may be connected to a core network by a wide area network (WAN). Each regional portion of the wireless carrier network 104 may include one or more RANs and a regional circuit and/or packet switched network and associated signaling network facilities. The wireless carrier network 104 may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and/or so forth. In some embodiments, the core network of the wireless carrier network 104 may accessed via wired or wireless local area networks (LANs). For example, a wireless local area network may be a network that is established using Wi-Fi or Bluetooth standards and hardware.

In various embodiments, the wireless carrier network 104 may provide telecommunication services to user devices 106(1)-106(M) of a user 110. In various embodiments, the user devices may include mobile handsets, smartphones, routers, home smart devices, vehicle smart devices, tablet computers, personal digital behaviors (PDAs), smart watches, and/or electronic devices. For example, the user device 106(1) may be a smartphone that is carried by the user 110 on the person of the user. The user device 106(2) may be a smart device at a residence 108 of the user 110 that is used to control home automation, provide news and entertainment, request information and trivia, keep in touch with their friends, play games, and so forth. The user device 106(M) may be an infotainment device on a vehicle 112 that the user 110 uses to activate or deactivate vehicle functions, check traffic patterns, navigate to destinations, and so forth.

Each of the user devices 106(1)-106(M) may be equipped with a copy of the collection application 114. The collection application 114 may be an over-the-top (OTT) application that is provided by the operator of the wireless carrier network and installed on the user device. The collection application 114 is responsible for collecting the user behavior data of the user device following user consent to the data collection. The user behavior data collected by each copy of the collection application 114 may include verbal communications. For example, the verbal communications may include conversations of the user with another party (whether in-person or during a telecommunication call), user utterances of the user, and spoken user commands of the user to other applications installed on the user device, among other things. In various embodiments, the verbal communications may be picked up by a microphone of the user device. Alternatively, verbal communication in the form of a conversation may be picked up by a telephony application on the user device during a telecommunication call.

The user behavior data that is collected by the collection application 114 may further include user application inputs and data provided by the sensors of a corresponding user device. The user application inputs may include key or gesture inputs to applications that are installed on the user device. For example, the user application inputs may include an address inputted into a navigation application, a selection of a city in a weather application, a note or message that is inputted by the user into a notation application, an event that is inputted into a calendar application, purchase patterns of the user in online shopping applications, and/or so forth. The sensor data provided by the sensors of the user device may include Global Positioning System (GPS) geolocation data, camera image or video data, compass reading data, accelerometer data, etc. For example, the user behavior data of the user 110 that is collected via the user devices 106(1)-106(M) may be the user behavior data 116(1)-116(M), respectively.

However, regardless of whether the user 110 has consented to the collection of a specific type of user behavior data, the collection application 114 is configured to only collect the specific type of user behavior data when it is legal to do so in a corresponding legal jurisdiction. For example, the collection application 114 may periodically send a geolocation of the user device to the authentication platform 102. In turn, the authentication platform 102 may use a database of privacy rules and regulations to determine the types of user behavior data that the wireless carrier network 104 is permitted to collect at the geolocation under the applicable privacy rules and regulations of the corresponding legal jurisdiction. As such, the authentication platform 102 may configure the collection application 114 to refrain from or suspend the collection of one or more specific types of user behavior data when the collection is prohibited by the privacy rules and regulations.

The user devices 106(1)-106(M) may send the collected user behavior data 116(1)-116(M) to the wireless carrier network 104. The collected user behavior data 116(1)-116(M) may be sent by the instances of the collection application 114 on these devices as persistent data representations, such as coded and/or encrypted messages that represent the user behavior data. In various embodiments, each user device may send the data via a communication link provided by the wireless carrier network 104, or a communication link that is provided by an alternative network in the form of a local area network (LAN), a larger network such as a wide area network (WAN), or a collection of networks, such as the Internet. Each batch of user behavior data that is sent by a user device may be labeled with metadata that includes a device identifier of the user device that collected the batch, the date and time of the collection, a corresponding application identifier of an application that received a user application input included in the batch, a corresponding identifier of a sensor that collected sensor data for the batch, and/or so forth.

The collected user behavior data of the user 110 over a predetermined period of time may be analyzed by the authentication platform 102 via a machine-learning algorithm to learn a baseline behavior pattern of the user. The baseline behavior pattern of the user may be determined based on user behavior data that includes user verbal communications, user application inputs, data provided by the sensors on a corresponding user device of the user, and/or so forth. In some embodiments, the authentication platform 102 may use a natural language processing (NLP) algorithm to extract the verbal expressions from the persistent data representations corresponding to the speech of the user. The NLP may use techniques such as morphological segmentation, part-of-speech tagging, word segmentation, named entity recognition (NER), etc. to parse the language contained in a persistent data representation (e.g., text) of the speech into speech entities that include semantics, concepts, nouns, etc. The speech entities are then fed into the machine learning model of the authentication platform 102.

Subsequently, as the authentication platform 102 receives additional user behavior data during a following specific time period, the authentication platform 102 may use the machine learning algorithm to detect one or more events that deviate from the baseline behavior pattern of the user during the specific time period. For example, an event may be the user going to a restaurant for lunch instead of bringing lunch or ordering a different item for lunch than the usual lunch item. Other examples of such events may be the user stopping by a dry cleaner to drop off clothing articles on the way to work, receiving a phone call from the school of the user's child while driving to work, running into an old friend on the bus while commuting to work, taking an emergency call early in the morning, going to a dentist appointment in the middle of the day, and/or so forth. Each event may be particularly memorable when considering the user's behavior because it is not a usual occurrence or deviates from the usual behavior of the user. Also, the event may deviate sufficiently from normal events in the life of the user so that a casual observer cannot correctly guess a detail of the event by knowing general life details or habits of the user.

The authentication platform 102 may use such events to perform adaptive authentication of the user 110. In operation, the authentication platform 102 may receive a request for adaptive authentication of the user 110 from an application 118 that is being used by the user 110. In turn, the authentication platform 102 may generate an authentication question 122 and a correct answer 124 for the authentication question 122 based on a detail of an event. The application 118 may be a standalone application on a user device, a web application that is accessible via a web interface, a client application that accesses an online service, and/or so forth. The application 118 may initiate the adaptive authentication when the user requests access to a resource 126 or when the user is accessing the resource 126. In various embodiments, the resource 126 may include any data or service that the user is entitled to access based on the identity of the user and/or is provided specifically to the user by a service provider. For example, the resource 126 may be an online financial account of the user, a social media account of the user, a user account of the user with a product or service provider, a communication account (e.g., email or instant messaging account), etc. Accordingly, the user may be requesting access to the resource to perform a transaction, such as creating, reading, updating, or deleting data of the resource, or use of the data of the resource in some other meaningful way. In various embodiments, the application 118 may request adaptive authentication by calling an application program interface (API) 128 of the authentication platform 102. For example, the API 128 may be an operating system API, a remote API, or a web API. Accordingly, the authentication platform 102 may handle the adaptive authentication of the user in conjunction with the application 118.

During the adaptive authentication, the authentication platform 102 may send a validation prompt 120 that includes the authentication question 122 to the application 118 for presentation to the user 110. The authentication question 122 may prompt the user 110 to input an answer to the question. For instance, as illustrated in example authentication screen 132, the authentication platform 102 may have determined that an event that deviated from the baseline behavior pattern of the user 110 is that the user 110 went to a new food establishment for lunch. Accordingly, the authentication platform 102 may generate an authentication question that pertains to the specific type sandwich that the user 110 purchased from this food establishment. The authentication question may be presented along with several multiple-choice answers that include a correct answer to the authentication question. Accordingly, the user 110 may select and submit one of the multiple-choice answers, such as answer 130, to the authentication platform 102 for authentication.

In turn, the authentication platform 102 may compare the answer 130 that is inputted by the user with the correct answer 124 to the authentication question 122. Thus, if the inputted answer 130 matches the correct answer 124, the authentication platform 102 may provide an indication to the application 118 that the user is authenticated. Otherwise, if the inputted answer does not match the correct answer, the authentication platform 102 may provide an indication to the application 118 that the user is not authenticated. In turn, the application 118 may take the appropriate action in response to the indication, such as granting the user 110 access to a resource if the user 110 is authenticated. Conversely, the application 118 may deny the user 110 access to the resource if the user 110 is not authenticated. Alternatively, the application 118 may prompt the authentication platform 102 to provide another validation prompt that has a different authentication question and a different correct answer so that the user 110 has an opportunity to retry the authentication. However, the application 118 may be configured to initiate a limited number of validation prompts in case of failure.

In various embodiments, the adaptive authentication provided by the authentication platform 102 is used by an application to supplement other form of authentication. For example, the application 118 may be configured to initially authenticate the user 110 based on primary user credentials (e.g., user name, password, etc.) submitted by the user 110 via a user interface. The user-behavior-based adaptive authentication is used as a secondary authentication verification mechanism following a determination that the primary user credentials are valid. In another example, the use of user-behavior-based adaptive authentication is triggered when biometric data of a user obtained by the application 118 fails to match biometric data of an authorized user. In such an example, the application 118 may be monitoring speech picked up by a user device as the user device is being used access a resource. Further, voiceprint analysis of the speech by the application 118 may indicate that an authorized user has not spoken near the user device for a predetermined period of time. Accordingly, the application 118 may trigger the authentication platform 102 to perform user-behavior-based adaptive authentication to verify that the authorized user is still in the proximity of the user device.

In some embodiments, the authentication platform 102 may configure the validation prompt 120 differently based on a role of the user or a nature of an action that the user is taking with respect to a resource (e.g., elevated vs. non-elevated). In such embodiments, a first form of the validation prompt 120 may include the authentication question 122 and multiple answers, in which the multiple answers consist of the correct answer 124 and several incorrect answers. A second form of the validation prompt 120 may include the authentication question 122 and a blank field for a user to manually input an answer. For example, the question may ask for the name of the bank teller that helped the user at the bank in the morning, and the user is expected to fill in the correct name. Generally speaking, the second form of the validation prompt 120 is more difficult to respond to, as the user is expected to recall the correct answer completely from memory and is unable to guess which of the answers is correct. Thus, in one instance, authentication platform 102 may use the first form of the validation prompt when the role of the user in accessing a resource is a private user, and use the second from when the role of the user in accessing the resource is an elevated role of an enterprise user. In another instance, the authentication platform 102 may use the first form of the validation prompt 120 for a first set of non-elevated actions with respect to a resource, and the second form the validation prompt 120 for a second set of elevated actions with respect to the resource. For example, if the action is a transfer of funds between two bank accounts, the authentication platform 102 may be configured to initiate the first form when the transfer amount is at or below a certain amount limit, and initiate the second form when the transfer amount is above the certain amount limit. In another example, the authentication platform may be configured to initiate the first form for a banking deposit transaction, and initiate the second form for a banking withdrawal transaction. In alternative embodiments, rather than using the second form of the validation prompt, the authentication platform 102 may be configured to increase the number of incorrect answers in the first form of the validation prompt for an elevated role or transaction, such that the chance of a correct guess is reduced.

Example User Device Components

Figure 2:
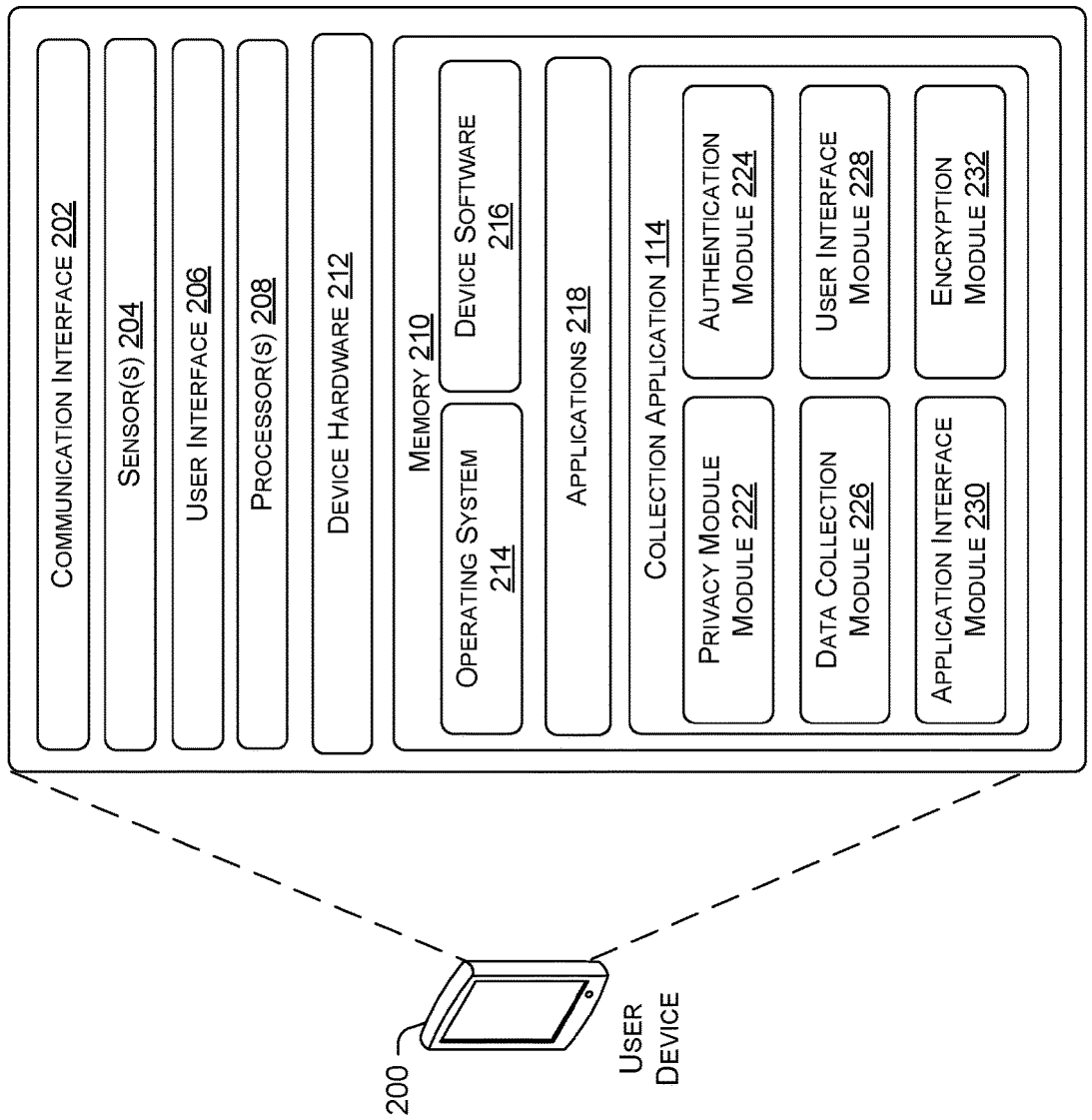
FIG. 2 is a block diagram showing various components of a user device that collects user behavior data of a user for the purpose of providing user-behavior-based adaptive authentication to the user.

FIG. 2 is a block diagram showing various components of a user device that collects user behavior data of a user for the purpose of providing user-behavior-based adaptive authentication to the user. The user device 200 may include a communication interface 202, one or more sensors 204, a user interface 206, one or more processors 208, memory 210, and device hardware 212. The communication interface 202 may include wireless and/or wired communication components that enable the electronic device to transmit or receive voice or data communication via the wireless carrier network 104, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect movement of objects that are proximate the user device 200. The compass, the accelerometer, and/or the GPS sensor, among other appropriate sensors, may detect orientation, movement, and geolocation of the user device 200. The cameras may capture images of the environment around the user device 200.

The user interface 206 may enable a user to provide inputs and receive outputs from the user device 200. The user interface 206 may include one or more data output devices (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 212 may include a modem that enables the user device 200 to perform telecommunication and data communication with the wireless carrier network 104. The device hardware 212 may further include signal converters, antennas, hardware decoders and encoders, graphic processors, a universal integrated circuit card (UICC) or an embedded UICC (eUICC), and/or the like that enable the user device 200 to execute applications and provide telecommunication and data communication functions.

The one or more processors 208 and the memory 210 of the user device 200 may implement an operating system 214, device software 216, one or more applications 218, and the collection application 114. Such software may include routines, program instructions, objects, and/or data structures that are executed by the processors 208 to perform particular tasks or implement particular abstract data types.

The operating system 214 may include components that enable the user device 200 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with the modem and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include basic input/output system (BIOS), bootrom, or a bootloader that boots up the user device 200 and executes the operating system 214 following power up of the device.

The applications 218 may include applications that provide utility, entertainment, and/or productivity functionalities to a user of the user device 200. For example, the applications 218 may include telephony applications, electronic mail applications, remote desktop applications, web browser applications, navigation applications, office productivity applications, multimedia streaming applications, online shopping applications, and/or so forth.

The collection application 114 may include a privacy module 222, an authentication module 224, a data collection module 226, a user interface module 228, an application interface module 230, and an encryption module 232. These modules may include routines, program instructions, objects, and/or data structures that perform particular tasks or implement particular abstract data types.

The privacy module 222 may provide a user interface that enables the user 110 to select or unselect the type of user behavior data that may be collected by the data collection module 226. For example, the user interface may provide a list of user behavior data that are potentially accessible to the data collection module 226. The list may include different types of user behavior data, such as speech data, application input data, sensor data, etc. The list may include checkboxes that allow a user to designate specific types of user behavior data that may be collected by the data collection module 226. Conversely, the user 110 may use the list to disable all data collection by the data collection module 226. The privacy module 222 may configure the data collection module 226 to collect or not collect different types of user behavior data based on the selections of the user 110. In this way, the privacy of the user 110 may be protected by the privacy module 222.

The authentication module 224 may enable the user 110 to create an account with the authentication platform 102 for the purpose of using the services provided by the authentication platform. In various embodiments, the user 110 may submit one or more authentication credentials to the authentication module 224 in order to establish with the authentication platform 102 that the user 110 is an authorized user. The authentication credential is transmitted by the authentication module 224 to the authentication platform 102. The authentication credential may include one or more of a user identifier, a password, an electronic identifier, a digital certificate, biometric characteristics, and/or so forth. In some embodiments, the user identifier may be a unique identifier that is created by or assigned to the user by the wireless carrier network 104 to identify the user. For example, the user identifier may be a subscriber access identifier that is used by the wireless carrier network 104 to authenticate the user via a built-in authentication mechanism for the purpose of providing the user with access to telecommunication services and/or applications that are hosted by the wireless carrier network 104, as well as services and/or applications hosted by third-party service and/or application providers.

The data collection module 226 may collect user behavior data of the user 110 from multiple sources. These sources may include the sensors 204 (e.g., a fingerprint reader), the user interface 206 (e.g., a microphone, a keyboard, etc.), and/or applications 218 that execute on the user device 200. In some embodiments, the data collection module 226 may use a speech-to-text engine to convert the speech picked up by a microphone or a telephony application of the user device 200 into persistent data representations for transfer to the authentication platform 102. The data collection module 226 may use application program interfaces (APIs) or software hooks components to intercept the user inputs and application events that are captured or generated by the sensors 204 and the applications 218. The user inputs and application events are then coded by the data collection module 226 into persistent data representations for transfer to the authentication platform 102. In various embodiments, the data collection module 226 may use different protocols to transmit the persistent data representations to the authentication platform 102. The protocols may include the common gateway interface (CGI) protocol, the active server pages (ASP) protocol, asynchronous JavaScript and XML (AJAX), hypertext transfer protocol secure (HTTPS) protocol, and/or the like.

The user interface module 228 may enable the collection application 114 to interact with the user 110. In various embodiments, the user interface module 228 may present visual and/or audio messages via the user interface 206 of the user device 200. The user interface module 228 may present these messages under the direction of the authentication platform 102. The messages may include validation prompts, such as the validation prompt 120, for the user 110 to confirm the identity of the user 110 to the authentication platform 102. In turn, the user interface module 228 may receive user inputs of answers to authentication questions and transmit the answers to the authentication platform 102. In some embodiments, the authentication platform 102 may direct the user interface module 228 to present the validation prompts on behalf of an application, such as one of the applications 218. However, in other embodiments, a third-party application may obtain validation prompts directly from the authentication platform 102 via an API, and independently present the validation prompts using their own user interfaces.

The application interface module 230 may interface with the applications 218 that are installed on the user device 200 under the direction of the authentication platform 102. In some instances, the application interface module 230 may receive indications of whether a user is authenticated or failed to be authenticated from the authentication platform 102. Further, the application interface module 230 may be configured by the authentication platform 102 to communicate the indications to a particular application, such as one of the applications 218. For example, the application interface module 230 may store the indications in a data buffer, and the particular application may call an API provided by the application interface module 230 to obtain the indications. However, in other embodiments, the authentication platform 102 may directly communicate the indications to an application without the intervention of the application interface module 230.

The encryption module 232 may encrypt outgoing data and decrypted incoming data using various encryption schemes. For example, the encryption may be implemented using various asymmetric and symmetric encryption techniques such as public key infrastructure (PKI) key negotiation and encryption, Diffie-Hellman key exchange, and/or so forth. In some instances, the encryption module 232 may also implement hash-based techniques to specify and verify the authenticity of the data that are exchanged between the entities. For example, the hash-based techniques may include the use of MD5 hashing, SHA-1 hashing, and/or so forth, to generate keyed-hash message authentication codes (HMAC). Accordingly, the encryption module 232 may be used by the collection application 114 to securely exchange data with the authentication platform 102.

Example Authentication Platform Components

Figure 3:
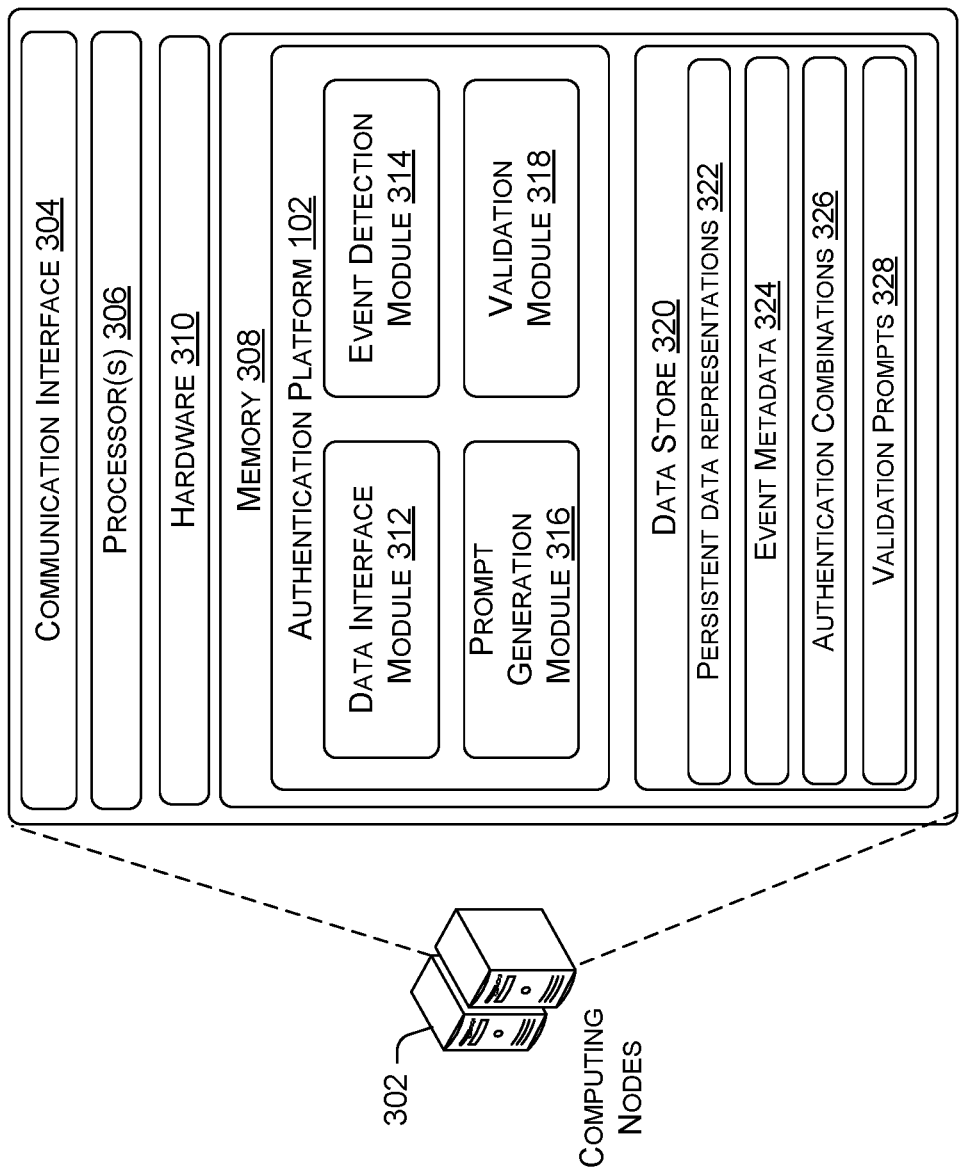
FIG. 3 is a block diagram showing various components of an authentication platform that provides user-behavior-based adaptive authentication to the user.

FIG. 3 is a block diagram showing various components of an authentication platform that provides user-behavior-based adaptive authentication to the user. The authentication platform 102 may be implemented by computing nodes 302. The computing nodes 302 may include a communication interface 304, one or more processors 306, and memory 308. The communication interface 304 may include wireless and/or wired communication components that enable the one or more computing nodes 302 to transmit data to and receive data from other networked devices. The computing nodes 302 may be accessed via hardware 310. The hardware 310 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The authentication platform 102 may be stored in the memory 308. The authentication platform 102 may include a data interface module 312, an event detection module 314, a prompt generation module 316, and a validation module 318. The modules may include routines, program instructions, objects, and/or data structures that perform particular tasks or implement particular abstract data types. The memory 308 may be further configured to implement a data store 320.

The data interface module 312 may receive persistent data representations 322 of user behavior data from one or more instances of the collection application 114. The persistent data representations of a user may be labeled with a corresponding user identifier. In some embodiments, the user identifier may be a unique identifier that is created by or assigned to the user by the wireless carrier network 104 to identify the user. For example, the user identifier may be the subscriber access identifier that is used by the wireless carrier network 104 to authenticate the user. The data interface module 312 may use a communication protocol to receive the persistent data representations from an instance of the collection application 114. For example, the communication protocol may be the CGI protocol, the ASP protocol, AJAX protocol, HTTPS protocol, and/or the like. In turn, the data interface module 312 may provide validation prompts, such as the validation prompt 120, to an application. For example, the application may be a standalone application on a user device, a web application that is accessible via a web interface, a client application that accesses an online service, and/or so forth. In various embodiments, the data interface module 312 may use a decryption algorithm to decrypt the data received by the data interface module 312. Conversely, the data interface module 312 may use an encryption algorithm to encrypt the data for transmission to another application.

The event detection module 314 may use machine learning to detect events that deviate from the baseline behavior pattern of the user. In various embodiments, the event detection module 314 may use machine learning to identify a baseline behavior pattern of a user based on the corresponding user behavior data for a predetermined time period. Subsequently, the event detection module 314 may use machine learning to detect one or more events that deviate from the baseline behavior pattern of the user during an additional specific time period using corresponding new user behavior data. Various classification schemes (explicitly and/or implicitly trained) and/or systems may be employed for the identification of the baseline behavior pattern and the detection of these deviated events. A classifier is a function that maps an input attribute vector, $x=(x_1, x_2, x_3, x_4, \ldots x_n)$, to a confidence that the input belongs to a class, that is, f(x)=confidence(class). Such classification may employ a probabilistic and/or statistical-based analysis (e.g., factoring into the analysis utilities and costs) to generate the machine learning model. A support vector machine (SVM) is an example of a classifier that may be employed by the event detection module 314. The SVM operates by finding a hypersurface in the space of possible inputs, which hypersurface attempts to split the triggering criteria from the non-triggering events. Other directed and undirected classification approaches include, e.g., naïve Bayes, Bayesian networks, decision trees, neural networks, fuzzy logic models, and probabilistic classification models providing different patterns of independence may also be employed. However, any appropriate directed or undirected machine learning classification approach may be used.

The details of the detected events may be stored by the event detection module 314 in the data store 320 as event metadata 324. The details for a detected event may include an event identifier, a user identifier of the user associated with the event, a time and date stamp indicating when the event occurred, a geolocation where the event occurred, parties that participated in the event, products or services that are involved in the event, transactions that occurred during the event, a duration of the event, an expiration timestamp for the event, and/or other pertinent information. The expiration timestamp indicates a time and/or date after which no validation prompt should be generated based on the event. The expiration timestamp may ensure that validation prompts are not generated for stale events for which a user is unable to accurately recalled the details and provide the correct answer.

The prompt generation module 316 may generate an authentication combination based on a detail of an event. In various embodiments, the prompt generation module 316 may generate the authentication combination response to a request for adaptive authentication that is received from an application. The prompt generation module 316 may verify that the event has not expired before performing the generation of the authentication combination. The authentication combination may include an authentication question and a correct answer. For example, an event may be a user going to a restaurant for lunch instead of bringing lunch. Accordingly, the prompt generation module 316 may generate an authentication combination that includes a question regarding the specific food item that the user had for lunch, and a correct answer that names the specific food item. In another example, an event may be the user stopping by a dry cleaner to drop off clothing articles to be dry cleaned on the way to work. Accordingly, a generated authentication combination may include a question regarding a number of shirts that the user dropped off, and a correct answer that provides the specific number of shirts. In an additional example, an event may be the user running into an old friend on the bus while commuting to work. Accordingly, a generated authentication combination may include a question regarding a name of the friend, and a correct answer that identifies the name of the friend. The prompt generation module 316 may store the generated authentication combinations 326 in the data store 320. Each of the authentication combination may be labeled with metadata that indicate an identifier of the authentication combination, the date and time of the corresponding event, a user identifier of the user associated with the corresponding event, and/or other identification information. The prompt generation module 316 may generate multiple authentication combinations with respect to a single detail of an event.

Furthermore, the prompt generation module 316 may use the authentication combination to generate a validation prompt. In some instances, the validation prompt that is generated by the prompt generation module 316 may be a multiple-choice validation prompt, though one of skill in the art will recognize that the validation prompt that is generated by the prompt generation module 316 may be any appropriate validation prompt. The multiple-choice validation prompt may include an authentication question and a correct answer that is accompanied one or more false answers, in which the false answers are contextually generated to blend in with the correct answer. For example, if the correct answer is a name of a person that is known to the user, the false answers may be names of other peoples that the user behavior data indicates are known to the user. In another example, if the correct answer is a number, the false answers may be numbers that are close to the correct number. In other instances, the validation prompt that is generated may be a fill-in validation prompt. The fill-in validation prompt may include an authentication question, and a field for the manual input of a correct answer. Each of the validation prompt may be labeled with metadata that identifies the validation prompt, an identifier of the associated authentication combination, a user identifier of the user for whom the validation prompt is generated, an indicator that identifies whether the validation prompt was previously presented to the user, and/or other information.

The validation module 318 may provide APIs that can be called by an application, such as the application 118, to perform an adaptive authentication using validation prompts that are generated based on user behavior data. The application may be a standalone application on a user device, a web application that is accessible via a web interface, a client application that accesses an online service, and/or so forth. The application may provide a user identifier of a user to the validation module 318 to initiate a generation of a validation prompt for the user. In various embodiments, the user identifier may be a unique identifier that is created by or assigned to the user by the wireless carrier network 104 to identify the user. For example, the application may initiate the adaptive authentication when the user is requesting access to a resource or when the user is accessing the resource. In turn, the validation module 318 may trigger the prompt generation module 316 to generate a validation prompt for the user identified by the user identifier based on a corresponding authentication combination. In some embodiments, the application may provide an indication to the validation module 318 whether to generate a multiple-choice validation prompt or a fill-in validation prompt or any other appropriate type of validation prompt. In turn, the validation module 318 may trigger the prompt generation module 316 to generate the appropriate validation prompt based on an authentication combination stored in the data store 320. In various embodiments, the validation module 318 may pass the validation prompt to the application that requested the adaptive authentication, such that the application may present the validation prompt to a user via a user interface.

Subsequently, the validation module 318 may receive an inputted answer in response to the validation prompt. The inputted answer may be received from the application that requested the adaptive authentication. For example, the user may have used a user interface provided by the application to select or manually input the answer. In turn, the application may transmit the inputted answer to the authentication platform 102 for validation. The inputted answer may be tagged with a corresponding user identifier, an authentication combination identifier, and/or a validation prompt identifier by the application, in which the one or more identifiers can be used to locate the corresponding correct answer. Thus, if the inputted answer matches the correct answer of the corresponding authentication combination, the validation module 318 may provide an indication to the application that the user is authenticated. Otherwise, if the inputted answer does not match the correct answer, the validation module 318 may provide an indication to the application that the user is not authenticated. In turn, the application may take the appropriate action in response to the indication.

The data store 320 may store the data that is received and processed by the various modules of the authentication platform 102. The data store 320 may include one or more databases, such as relational databases, object databases, object-relational databases, and/or key-value databases. The data stored in the data store 320 may include the persistent data representations 322, event metadata 324, authentication combinations 326, validation prompts 328, and/or other relevant data.

Example Processes

FIGS. 4-9 present illustrative processes 400-900 that provide user-behavior-based adaptive authentication to a user based on user behavior data on the user that is collected by user devices. Each of the processes 400-900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-900 are described with reference to the architecture 100 of FIG. 1.

Figure 4:
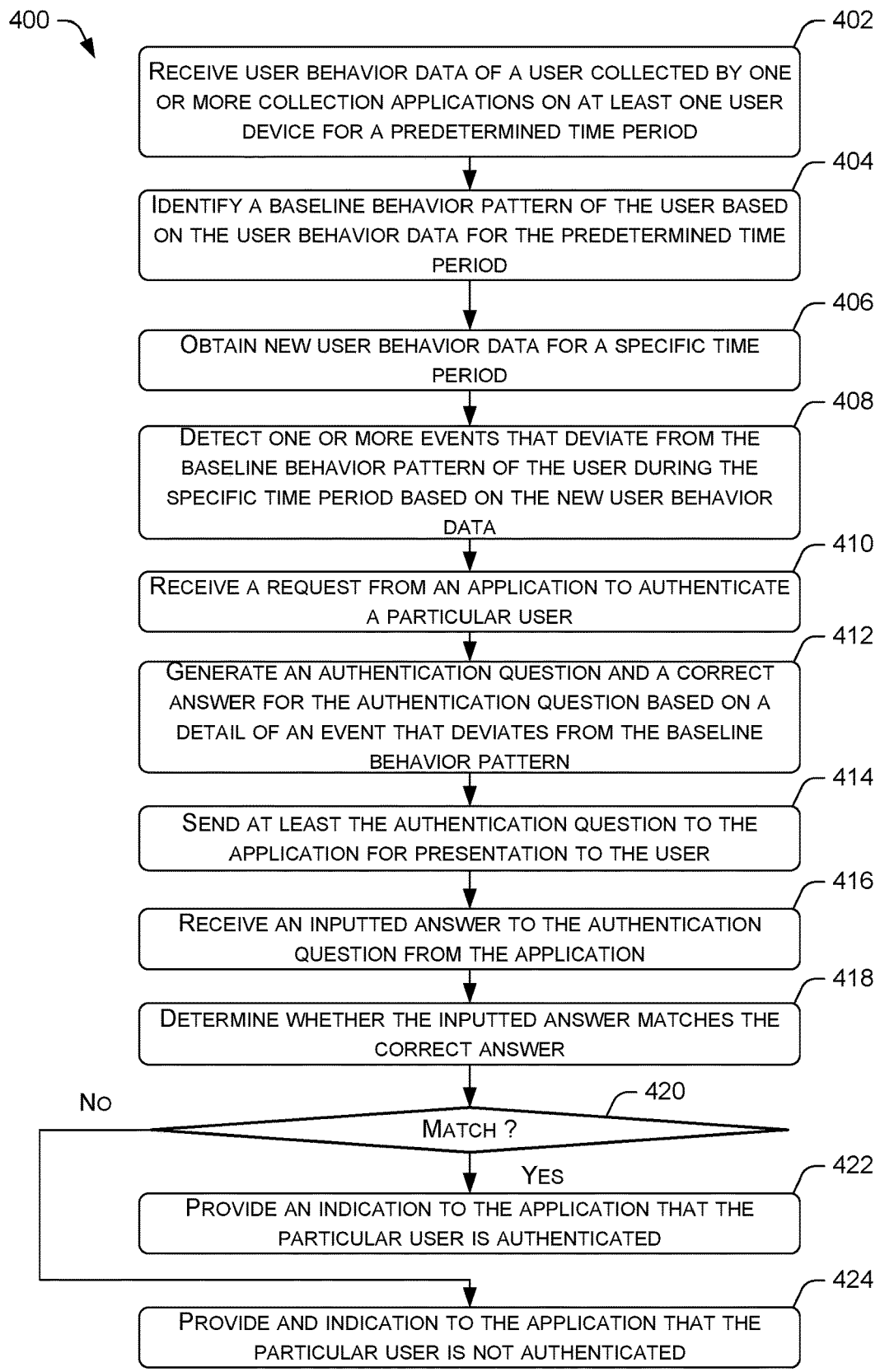
FIG. 4 is a flow diagram of an example process for using user behavior data of a user to perform user-behavior-based adaptive authentication of the user.

FIG. 4 is a flow diagram of an example process 400 for using user behavior data of a user to perform user-behavior-based adaptive authentication of the user. At block 402, the authentication platform 102 may receive user behavior data of a user collected by one or more applications on at least one user device for a predetermined time period. Each of the one or more applications may be a copy of the collection application 114. The user behavior data collected by each copy of the collection application 114 may include verbal communications, user application inputs, data provided by the sensors of a corresponding user device, and/or so forth. For example, the user behavior data of the user 110 that is collected via the user devices 106(1)-106(M) may be the user behavior data 116(1)-116(M), respectively.

At block 404, the authentication platform 102 may identify a baseline behavior pattern of the user based on the user behavior data for the predetermined time period. In various embodiments, the authentication platform 102 may use a machine-learning algorithm to learn the baseline behavior pattern of the user. The baseline behavior pattern of the user may be determined based on user behavior data that includes user verbal communications, user application inputs, data provided by the sensors on a corresponding user device of the user, and/or so forth, over the predetermined time period.

At block 406, the authentication platform 102 may obtain new user behavior data of the user for a specific time period. The new user behavior data may be collected by one or more copies of the collection application 114 that are installed on user devices. Once again, the user behavior data collected by each copy of the collection application 114 may include verbal communications, user application inputs, data provided by the sensors of a corresponding user device, and/or so forth.

At block 408, the authentication platform 102 may detect one or more events that deviate from the baseline behavior pattern of the user during the specific time period based on the new user behavior data. In various embodiments, the authentication platform 102 may use the machine learning algorithm to detect the one or more events. For example, an event may be the user going to a restaurant for lunch instead of bringing in lunch or ordering a different item for lunch than the usual lunch item. Other examples of such events may be the user stopping by a dry cleaner to drop off clothing articles to be dry cleaned on the way to work, receiving a phone call from the school of the user's child while driving to work, or running into an old friend on the bus while commuting to work.

At block 410, the authentication platform 102 may receive a request from an application to authenticate a particular user. In various embodiments, the application may be a standalone application on a user device, a web application that is accessible via a web interface, a client application that accesses an online service, and/or so forth. The application may initiate the adaptive authentication when the user is requesting access to a resource or when the user is accessing the resource. The application may initiate the request by calling an API of the authentication platform 102 with the request to authenticate the particular user, in which the request includes a user identifier of the user. For example, the API may be an operating system API, a remote API, or a web API.

At block 412, the authentication platform 102 may generate an authentication question and a correct answer for the question based on a detail of an event that deviates from the baseline behavior pattern. The authentication question and the correct answer may be generated as an authentication combination that is identified by a user identifier of the user. At block 414, the authentication platform 102 may send at least the question to an application for presentation to the user. In various embodiments, the authentication question may be sent in a validation prompt to the application, in which the validation prompt is identified by the user identifier of the user. The validation prompt may be in the form of a multiple-choice validation prompt or a fill-in validation prompt or any other appropriate validation method prompt.

At block 416, the authentication platform 102 may receive an inputted answer from the application. For example, the particular user may have used a user interface provided by the application to select or manually input the answer. In turn, the application may transmit the inputted answer to the authentication platform 102 for validation. The inputted answer may be tagged with the user identifier of the user or a validation prompt identifier of the validation prompt to enable the authentication platform 102 to check the inputted answer against the corresponding correct answer.

At block 418, the authentication platform 102 may determine whether the inputted answer matches the correct answer. In various embodiments, the authentication platform 102 may use the user identifier of the inputted answer to locate the correct answer from a corresponding authentication combination. Accordingly, if the authentication platform 102 determines that the inputted answer matches the correct answer ("yes" at decision block 420), the process 400 may proceed to block 422. At block 422, the authentication platform 102 may provide an indication to the application that the particular user is authenticated. However, if the authentication platform 102 determines that the inputted answer does not match the correct answer ("no" at decision block 420), the process 400 may proceed to block 424. At block 424, the authentication platform 102 may provide an indication to the application that the particular user is not authenticated.

Figure 5:
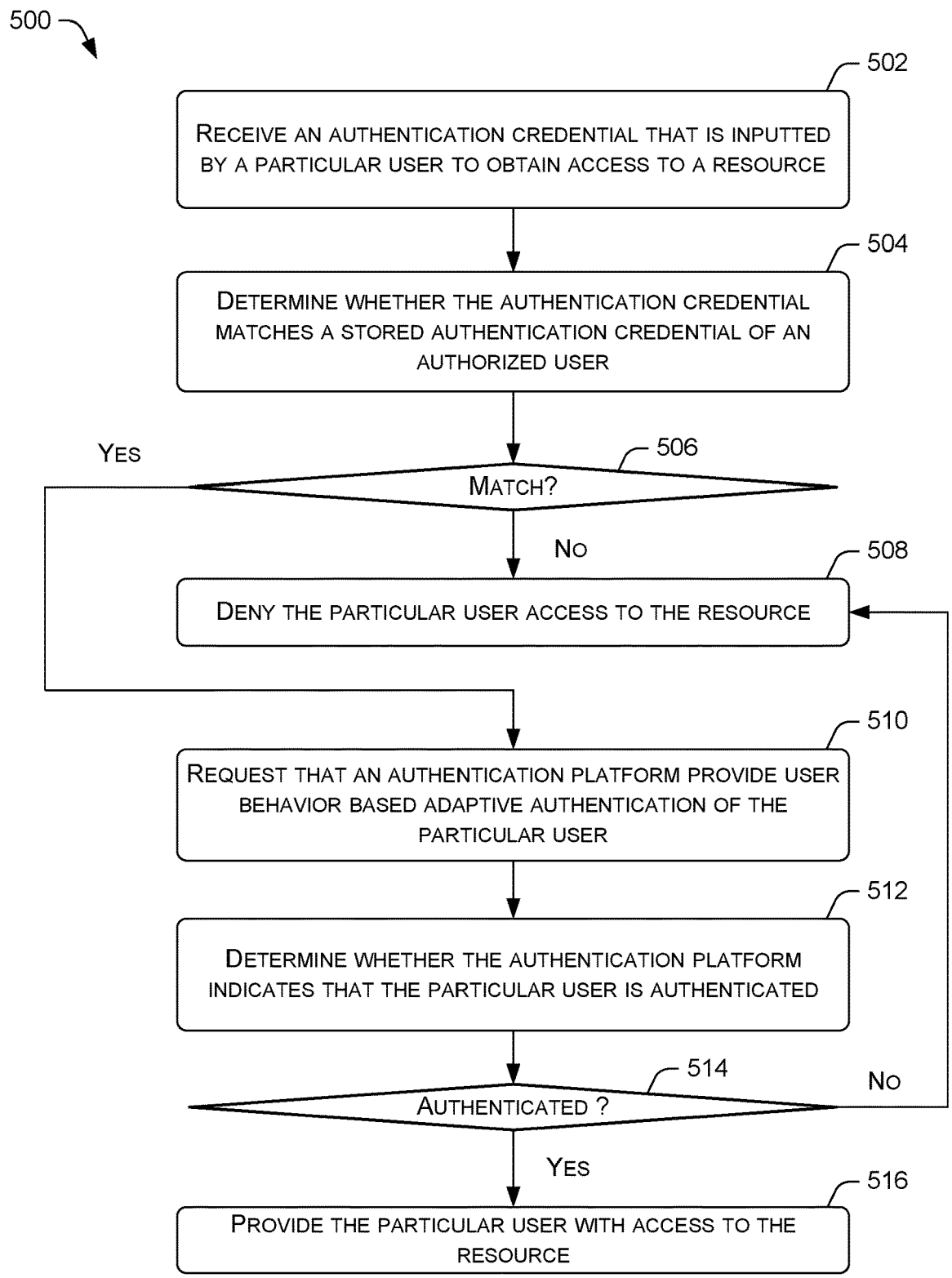
FIG. 5 is a flow diagram of an example process for using user-behavior-based adaptive authentication to verify that a user is authorized to access a resource following an input of a valid authentication credential by the user.

FIG. 5 is a flow diagram of an example process 500 for using user-behavior-based adaptive authentication to verify that a particular user is authorized to access a resource following an input of a valid authentication credential by the particular user. At block 502, an application may receive an authentication credential that is inputted by a user to obtain access to a resource. In various embodiments, the inputted authentication credential may include one or more of a user identifier, a password, an electronic identifier, a digital certificate, biometric characteristics, and/or so forth. The resource may include any data or service that the particular user is entitled to access based on the identity of the particular user and/or is provided specifically to the particular user by a service provider. The application may be a standalone application on a user device, a web application that is accessible via a web interface, a client application that accesses an online service, or any other appropriate application on any device or service accessible to a user.

At block 504, the application may determine whether the authentication credential matches a stored authentication credential of an authorized user. The stored authentication credential may be created by or assigned to the authorized user by an access control mechanism that regulates access to the resource. Thus, the stored authentication credential is used by the access control mechanism to authenticate the authorized user in order to provide the authorized user with access to the resource.

At decision block 506, the application may determine whether the authentication credentials inputted by the particular user match the stored authentication credential. Thus, if the application determines that the inputted authentication credential does not match the stored authentication credential, the process 500 may proceed to block 508. At block 508, the application may deny the user access to the resource. However, if the application determines at decision block 506 that the inputted authentication credential matches the stored authentication credential, the process 500 may proceed to block 510.

At block 510, the application may request that the authentication platform 102 provide user-behavior-based adaptive authentication of the particular user. In various embodiments, the authentication platform 102 may use a validation prompt that includes a question regarding an event that deviates from the baseline behavior pattern of the authorized user to authenticate the particular user. An example implementation of the user-behavior-based adaptive authentication is further described in the process 400. In various embodiments, the application may call an API of the authentication platform 102 with a user identifier of the authorized user to initiate the adaptive authentication.

At block 512, the application may determine whether the authentication platform 102 indicates that the particular user is authenticated. At decision block 514, if the application determines that authentication platform 102 indicates that the particular user is authenticated, the process 500 may proceed to block 516. At block 516, the application may provide the particular user with access to the resource. However, if the application determines at decision block 514 that the authentication platform indicates that the particular user is not authenticated, the process 500 may loop back to 508, so that the particular user is denied access to the resource.

Figure 6:
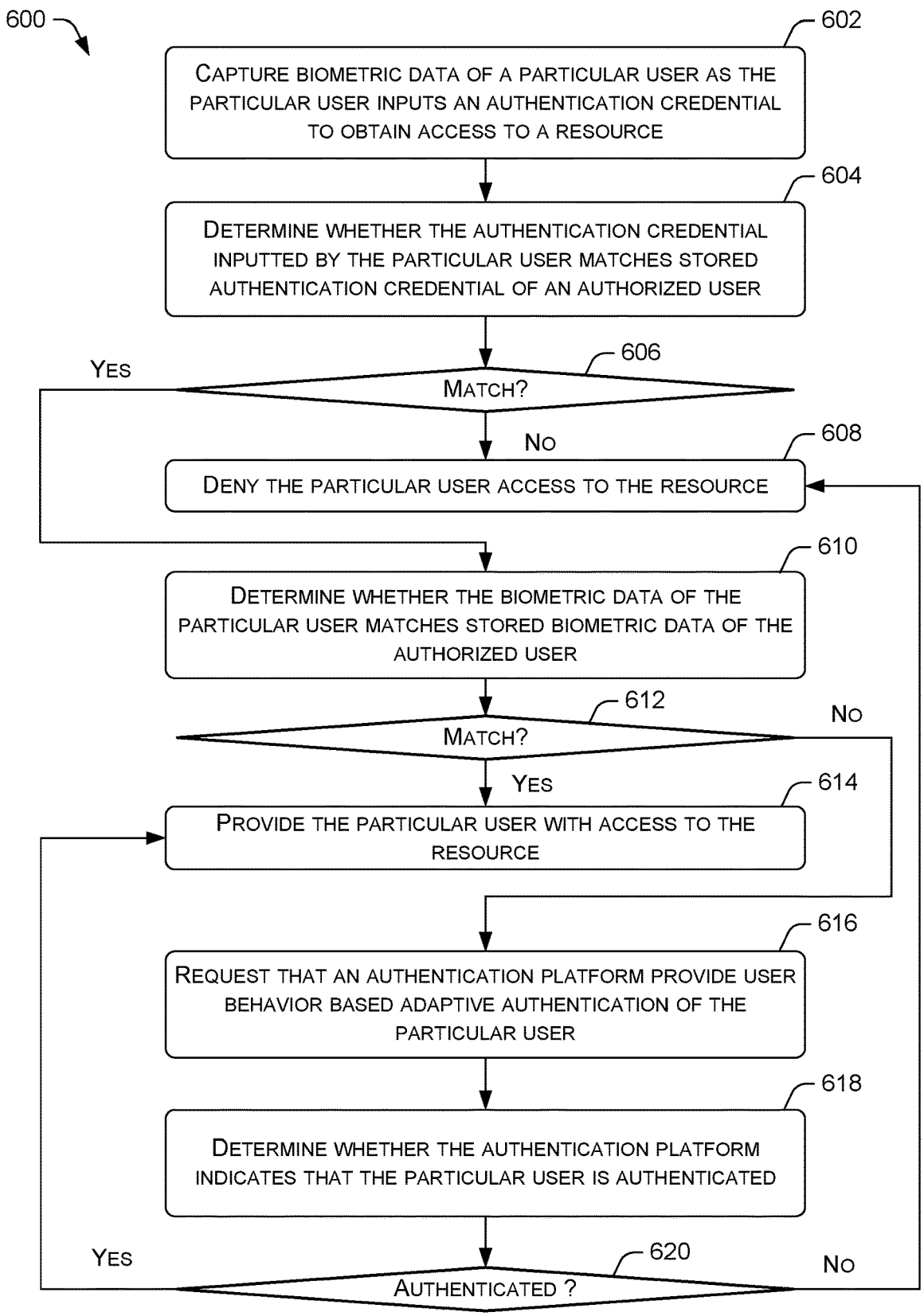
FIG. 6 is a flow diagram of an example process for using user-behavior-based adaptive authentication to verify that a user is authorized to access a resource following a biometric authentication failure of the user.

FIG. 6 is a flow diagram of an example process 600 for using user-behavior-based adaptive authentication to verify that a user is authorized to access a resource following a biometric authentication failure of the user. At block 602, an application may capture biometric data of a particular user as the particular user inputs an authentication credential to obtain access to a resource. The biometric data may be a full or partial facial image of the particular user, a voiceprint of the particular user, a fingerprint of the particular user, a retinal scan of the particular user, or some other biometric characteristic of the particular user. For example, the user device may activate a camera to capture the full or partial facial image of the particular user as the particular user is inputting the authentication credential. In another example, the user device may activate a microphone to capture the verbal expression of the particular user and generate a voiceprint. The resource may include any data or service that the particular user is entitled to access based on the identity of the particular user and/or is provided specifically to the particular user by a service provider. The application may be a standalone application on a user device, a web application that is accessible via a web interface, a client application that accesses an online service, or any other appropriate application accessible to a user.

At block 604, the application may determine whether the authentication credential inputted by the particular user matches a stored authentication credential of an authorized user. In various embodiments, the inputted authentication credential may include one or more of a user identifier, a password, an electronic identifier, a digital certificate, biometric characteristics, and/or so forth. The stored authentication credential may be created by or assigned to the authorized user by an access control mechanism that regulates access to the resource. Thus, the stored authentication credential is used by the access control mechanism to authenticate the authorized user in order to provide the authorized user with access to the resource.

Accordingly, if the application determines at decision block 606 that the inputted authentication credential does not match the stored authentication credential, the process 600 may proceed to block 608. At block 608, the application may deny the particular user access to the resource. However, if the application determines at decision block 606 that the inputted authentication credential matches the stored authentication credential, the process 600 may proceed to block 610.

At block 610, the application may determine whether the biometric data of the particular user matches the stored biometric data of the authorized user. The stored biometric data may be submitted by the authorized user to the application for establishing access to a user device on which the application resides. Alternatively, the stored biometric data may be submitted by the authorized user to the access control mechanism that regulates access to the resource.

Accordingly, if the application determines at decision block 612 that the biometric data of the particular user matches the stored biometric data of the authorized user, the process 600 may proceed to block 614. At block 614, the application may provide the particular user with access to the resource. However, if the application determines at decision block 612 that the biometric data of the particular user does not match the stored biometric data of the authorized user, the process 600 may proceed to block 616.

At block 616, the application may request that the authentication platform 102 provide user-behavior-based adaptive authentication of the particular user. In various embodiments, the authentication platform 102 may use a validation prompt that includes an authentication question regarding an event that deviates from the baseline behavior pattern of the authorized user to authenticate the particular user. An example implementation of the user-behavior-based adaptive authentication is further described in the process 400. In various embodiments, the application may call an API of the authentication platform 102 with a user identifier of the authorized user to initiate the adaptive authentication.

At block 618, the application may determine whether the authentication platform 102 indicates that the particular user is authenticated. At decision block 620, if the application determines that authentication platform 102 indicates that the particular user is authenticated, the process 600 may loop back to block 614, such that the application may provide the particular user with access to the resource. However, if the application determines at decision block 620 that the authentication platform 102 indicates that the particular user is not authenticated, the process 600 may loop back to 608, so that the particular user is denied access to the resource.

Figure 7:
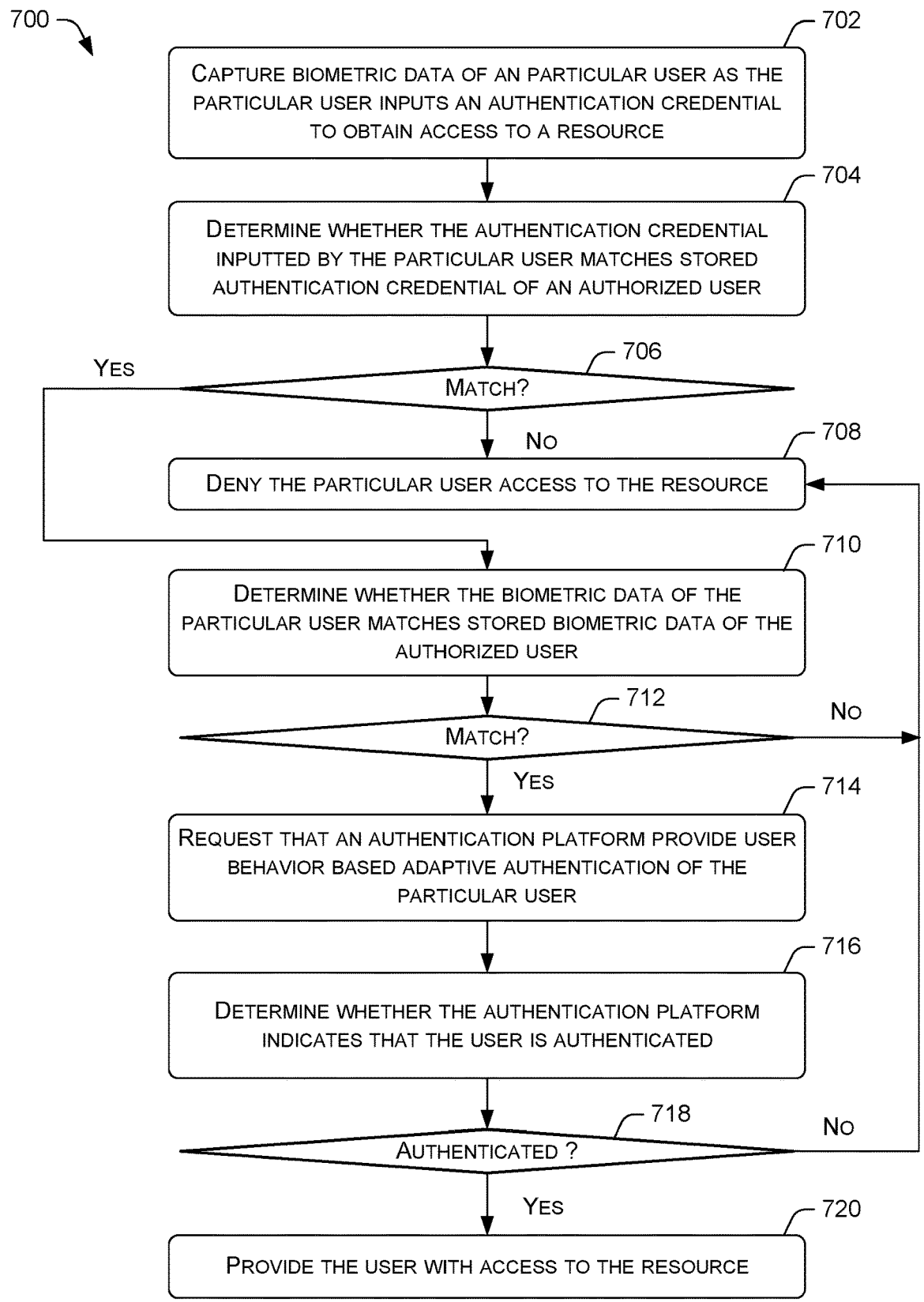
FIG. 7 is a flow diagram of an example process for using user-behavior-based adaptive authentication to verify that a user is authorized to access a resource following a biometric authentication of the user.

FIG. 7 is a flow diagram of an example process 700 for using user-behavior-based adaptive authentication to verify that a user is authorized to access a resource following a biometric authentication of the user. At block 702, an application may capture biometric data of a particular user as the particular user inputs an authentication credential to obtain access to a resource. The biometric data may be a full or partial facial image of the particular user, a voiceprint of the particular user, a full or partial fingerprint of the particular user, a full or partial retinal scan of the particular user, or some other biometric characteristic of the particular user. For example, the user device may activate a camera to capture the full or partial facial image of the user as the user is inputting the authentication credential. In another example, the user device may activate a microphone to capture the verbal expression of a particular user and generate a voiceprint. The resource may include any data or service that the particular user is entitled to access based on the identity of the particular user and/or that is provided specifically to the particular user by a service provider. The application may be a standalone application on a user device, a web application that is accessible via a web interface, a client application that accesses an online service, or any other appropriate application accessible to a user.

At block 704, the application may determine whether the authentication credential inputted by the particular user matches stored authentication credential of an authorized user. In various embodiments, the inputted authentication credential may include one or more of a user identifier, a password, an electronic identifier, a digital certificate, biometric characteristics, and/or so forth. The stored authentication credential may be created by or assigned to the authorized user by an access control mechanism that regulates access to the resource. Thus, the stored authentication credential is used by the access control mechanism to authenticate the authorized user in order to provide the particular user with access to the resource.

Accordingly, if the application determines at decision block 706 that the inputted authentication credential does not match the stored authentication credential, the process 700 may proceed to block 708. At block 708, the application may deny the particular user access to the resource. However, if the application determines at decision block 706 that the inputted authentication credential matches the stored authentication credential, the process 700 may proceed to block 710.

At block 710, the application may determine whether the biometric data of the particular user matches the stored biometric data of the authorized user. The stored biometric data may be submitted by the authorized user to the application for establishing access to a user device on which the application resides. Alternatively, the stored biometric data may be submitted by the authorized user to the access control mechanism that regulates access to the resource.

Accordingly, if the application determines at decision block 712 that the biometric data of the particular user matches the stored biometric data of the authorized user, the process 700 may proceed to block 714. At block 714, the application may request that the authentication platform 102 provide user-behavior-based adaptive authentication of the particular user. In various embodiments, the authentication platform 102 may use a validation prompt that includes a question regarding an event that deviates from the baseline behavior pattern of the authorized user to authenticate the particular user. An example implementation of the user-behavior-based adaptive authentication is further described in the process 400. In various embodiments, the application may call an API of the authentication platform 102 with a user identifier of the authorized user to initiate the adaptive authentication.

At block 716, the application may determine whether the authentication platform 102 indicates that the particular user is authenticated. At decision block 718, if the application determines that authentication platform 102 indicates that the particular user is authenticated, the process 700 may proceed to block 720. At block 720, the application may provide the particular user with access to the resource. However, if the application determines at decision block 718 that the authentication platform indicates that the particular user is not authenticated, the process 700 may loop back to 708, so that the particular user is denied access to the resource.

Figure 8:
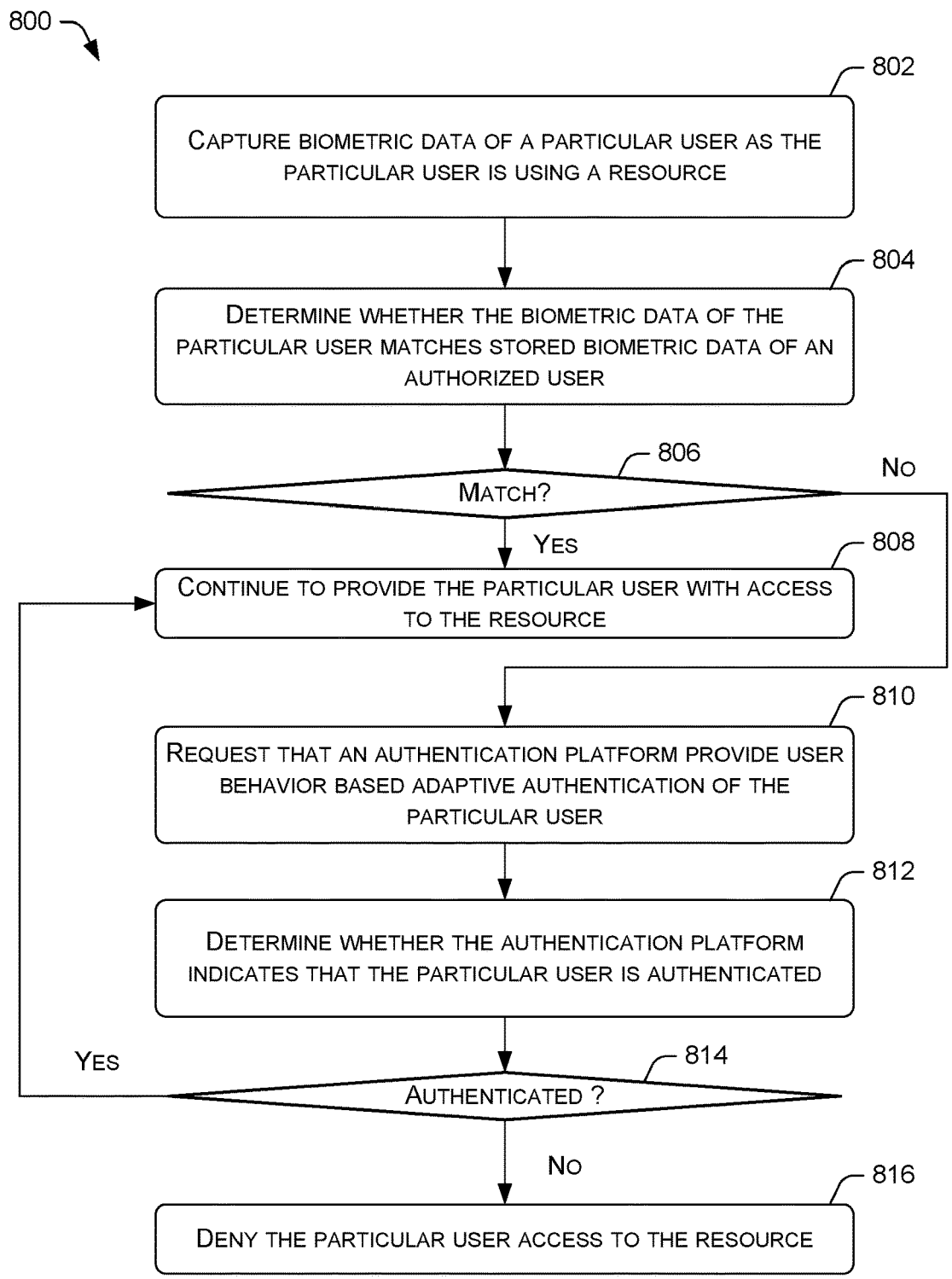
FIG. 8 is a flow diagram of an example process for using user-behavior-based adaptive authentication to verify that a user has continued access to a resource following a biometric authentication failure of the user.

FIG. 8 is a flow diagram of an example process 800 for using user-behavior-based adaptive authentication to verify that a user has continued access to a resource following a biometric authentication failure of the user. At block 802, an application may capture biometric data of a user that is using a resource. The biometric data may be a full or partial facial image of the particular user, a voiceprint of the particular user, a fingerprint of the particular user, a retinal scan of the particular user, or some other biometric characteristic of the particular user. For example, the user device may activate a camera to capture the full or partial facial image of the user as the user is inputting the authentication credential. In another example, the user device may activate a microphone to capture the verbal expression of a particular user and generate a voiceprint. The resource may include any data or service that the particular user is entitled to access based on the identity of the particular user and/or is provided specifically to the particular user by a service provider. The application may be a standalone application on a user device, a web application that is accessible via a web interface, a client application that accesses an online service, or any other appropriate application accessible to a user.

At block 804, the application may determine whether the biometric data of the particular user matches the stored biometric data of the authorized user. The stored biometric data may be submitted by the authorized user to the application for establishing access to a user device on which the application resides. Alternatively, the stored biometric data may be submitted by the authorized user to the access control mechanism that regulates access to the resource.

Accordingly, if the application determines at decision block 806 that the biometric data of the particular user matches the stored biometric data of the authorized user, the process 800 may proceed to block 808. At block 808, the application may continue to provide the particular user with access to the resource. However, if the application determines at decision block 806 that the biometric data of the particular user does not match the stored biometric data of the authorized user, the process 800 may proceed to block 810.

At block 810, the application may request that the authentication platform 102 provide user-behavior-based adaptive authentication of the particular user. In various embodiments, the authentication platform 102 may use a validation prompt that includes a question regarding an event that deviates from the baseline behavior pattern of the authorized user to authenticate the particular user. An example implementation of the user-behavior-based adaptive authentication is further described in the process 400. In various embodiments, the application may call an API of the authentication platform 102 with a user identifier of the authorized user to initiate the adaptive authentication.

At block 812, the application may determine whether the authentication platform 102 indicates that the particular user is authenticated. At decision block 814, if the application determines that authentication platform 102 indicates that the particular user is not authenticated, the process 800 may proceed to block 816. At block 816, the application may deny the particular user access to the resource. However, if the application determines at decision block 814 that the authentication platform 102 indicates that the particular user is authenticated, the process 800 may loop back to 808, so that application may continue to provide the particular user with access to the resource.

Figure 9:
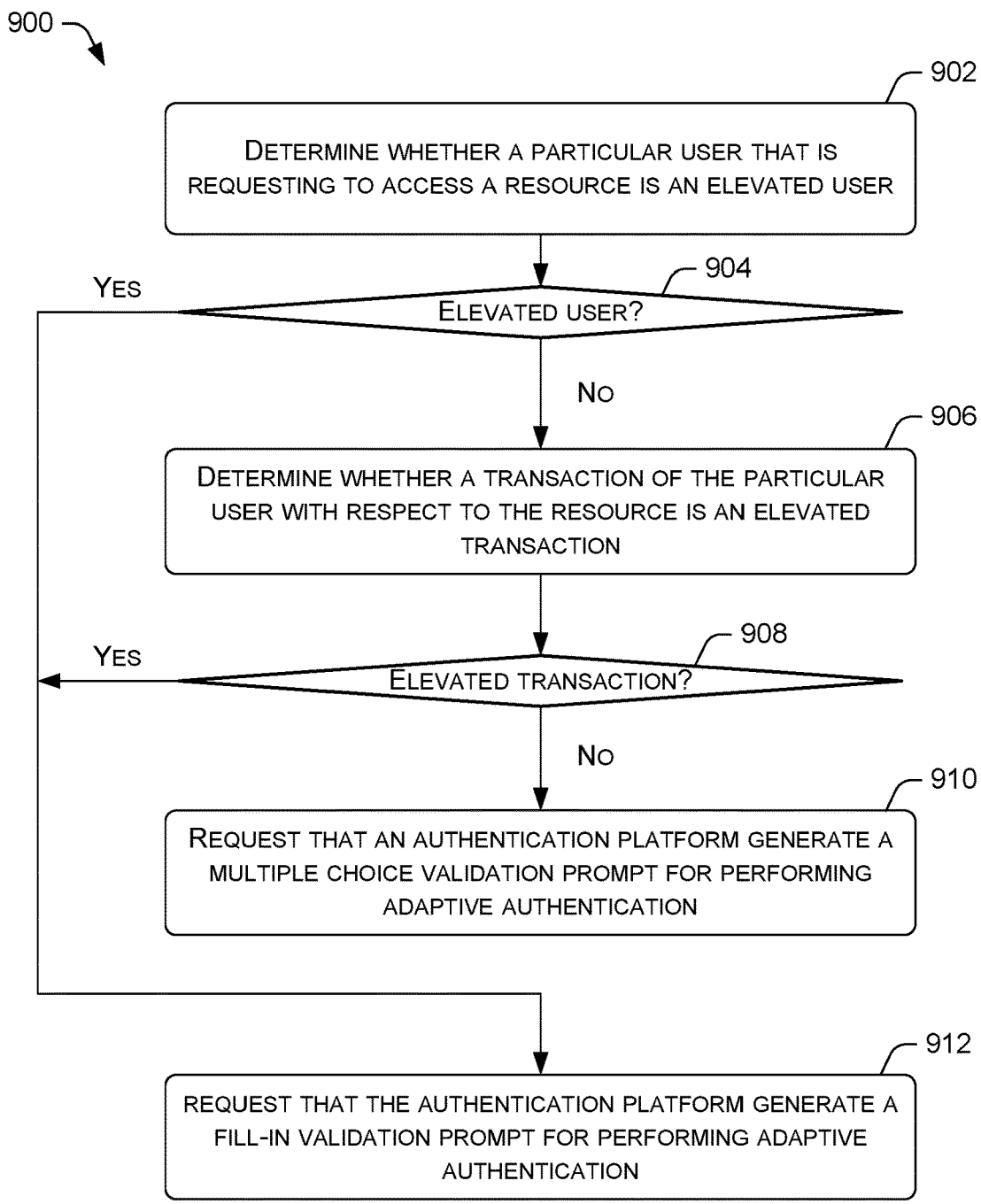
FIG. 9 is a flow diagram of an example process for performing a multiple choice or answer based adaptive authentication in view of user importance of a user or transaction importance of a transaction.

FIG. 9 is a flow diagram of an example process 900 for performing a multiple choice or answer based adaptive authentication in view of a user or transaction importance. At block 902, an application may determine whether a particular user that is requesting to access a resource is an elevated user. In various embodiments, an elevated user is a user whose user identifier indicates to the application that the user is performing an elevated role with respect to the resource. For example, the user may be an enterprise user of the resource instead of a private user. The resource may include any data or service that the particular user is entitled to access based on the identity of the particular user and/or is provided specifically to the particular user by a service provider. The application may be a standalone application on a user device, a web application that is accessible via a web interface, a client application that accesses an online service, or any other appropriate application accessible to a user.

At decision block 904, if the application determines that the particular user is not an elevated user, the process 900 may proceed to block 906. At block 906, the application may determine whether a transaction of the particular user with respect to the resource is an elevated transaction. An elevated transaction may be a transaction that modifies critical data or affects a critical service provided by the resource. For example, an elevated transaction may be the transfer of a monetary amount that is above a predetermined threshold between two financial accounts. In contrast, a normal transaction is a transfer of a monetary amount that is at or below the predetermined threshold. In another example, an elevated transaction may be a transaction to delete a piece of data, while other actions such as reading, modifying, or copying the piece of data are considered normal transactions.

Accordingly, if the application determines at decision block 908 that the transaction is not an elevated transaction, the process 900 may proceed to block 910. At block 910, the application may request that the authentication platform generate a multiple-choice validation prompt for performing the adaptive authentication. However, if the application determines at decision block 908 that the transaction is an elevated transaction, the process 900 may proceed to block 912. At block 912, the application may request that the authentication platform 102 generate a fill-in validation prompt for performing the adaptive authentication. Returning to decision block 904, if the application determines that the particular user is an elevated user, the process 900 may also proceed to block 912, so that the authentication platform 102 may generate the fill-in validation prompt.

The use of adaptive authentication based on user behavior data to supplement or replace other forms of user authentication may provide more secure user authentication without sacrificing user convenience. Further, the use of adaptive authentication based on user behavior data may provide an additional layer of security as such authentication is not reliant on persistent authentication credentials or biometric information that are vulnerable to hacking, duplication, cloning, and/or theft. Instead, adaptive authentication relies on the use of user behavior data that constantly changes as the user goes about his or her daily life.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media collectively storing computer-executable instructions that upon execution cause one or more computing nodes to collectively perform acts comprising:
    obtaining, from multiple instances of a collection application installed on multiple user devices associated with a user, user behavior data of the user that comprises at least verbal expressions of the user as captured by a user device of the multiple user devices;
    identifying, using a machine learning algorithm, a baseline behavior pattern of a user based on the user behavior data collected within a predetermined time period from the multiple user devices;
    detecting, using the machine learning algorithm, an event that deviates from the baseline behavior pattern of the user during a specific time period based on new user behavior data of the user obtained during the specific time period; and
    in response to receiving a request from an application to authenticate a particular user for access or continued access to a resource, generating an authentication question and a correct answer for the authentication question based on a detail of the event that deviates from the baseline behavior pattern, the authentication question comprising a natural language question relating to the event that deviates from the baseline behavior pattern and the correct answer comprising the detail of the event that deviates from the baseline behavior pattern.

2. The one or more non-transitory computer-readable media of claim 1, wherein the acts further comprise:
    sending a validation prompt that includes at least the authentication question to the application for presentation to the particular user;
    receiving an inputted answer to the authentication question from the application in response to the validation prompt;
    providing a first indication to the application that the particular user is authenticated in response to the inputted answer matching the correct answer; and
    providing a second indication to the application that the particular user is not authenticated in response to the inputted answer failing to match correct answer.

3. The one or more non-transitory computer-readable media of claim 2, wherein the application provides the particular user with access to the resource in response to the first indication, and denies the particular user access to the resource in response to the second indication.

4. The one or more non-transitory computer-readable media of claim 2, wherein the validation prompt is a multiple-choice validation prompt that further includes a plurality of answers that comprise the correct answer and one or more incorrect answers such that the inputted answer is one of the plurality of answers, or a fill-in validation prompt that prompts for a manual input of the inputted answer to the authentication question.

5. The one or more non-transitory computer-readable media of claim 4, wherein the sending the validation prompt includes sending the fill-in validation prompt to the application when the particular user is an elevated user or when a transaction of the particular user with respect to the resource is an elevated transaction.

6. The one or more non-transitory computer-readable media of claim 1, wherein the receiving the request includes receiving the request to authenticate the particular user in response to an authentication credential inputted by the particular user to the application failing to match a stored authentication credential of the user.

7. The one or more non-transitory computer-readable media of claim 1, wherein the receiving the request includes receiving the request to authenticate the particular user in response to an authentication credential inputted by the particular user to the application matching a stored authentication credential of an authorized user, and biometric data of the particular user as captured by the application failing to match stored biometric data of the user.

8. The one or more non-transitory computer-readable media of claim 7, wherein the biometric data includes one or more of a full or partial facial image of the particular user, a voiceprint of the particular user, a fingerprint of the particular user, or a retinal scan of the particular user.

9. The one or more non-transitory computer-readable media of claim 1, wherein the receiving the request includes receiving the request to authenticate the particular user in response to an authentication credential inputted by the particular user to the application matching a stored authentication credential of an authorized user, and biometric data of the particular user as captured by the application matching stored biometric data of the user.

10. The one or more non-transitory computer-readable media of claim 9, wherein the sensor data includes at least one of Global Positioning System (GPS) geolocation data, camera image data, video data, compass reading data, or accelerometer data.

11. The one or more non-transitory computer-readable media of claim 1, wherein the user behavior data is collected by each of the multiple instances of a collection application following each instance of the collection application receiving a user input indicating that the user consents to collection of the user behavior data.

12. The one or more computer-readable media of claim 1, wherein the baseline behavior pattern comprises a persistent verbal expression in the speech of the user and the one or more events that deviate from the baseline behavior of the user comprises a deviation from the persistent verbal expression.

13. A computer-implemented method, comprising:
  obtaining, from multiple instances of a collection application installed on multiple user devices associated with a user, user behavior data of the user that comprises at least verbal expressions of the user as captured by a user device of the multiple user devices,
  identifying, using a machine learning algorithm, a baseline behavior pattern of a user based on the user behavior data collected within a predetermined time period from the multiple user devices;
  detecting, using the machine learning algorithm of the wireless carrier network, an event that deviates from the baseline behavior pattern of the user during a specific time period based on new user behavior data of the user obtained during the specific time period; and
  in response to receiving a request from an application to authenticate a particular user for access or continued access to a resource, generating an authentication question and a correct answer for the authentication question based on a detail of the event that deviates from the baseline behavior pattern, the authentication question comprising a natural language question relating to the event that deviates from the baseline behavior pattern and the correct answer comprising the detail of the event that deviates from the baseline behavior pattern.

14. The computer-implemented method of claim 13, further comprising:
  sending a validation prompt that includes at least the authentication question to the application for presentation to the particular user;
  receiving an inputted answer to the authentication question from the application in response to the validation prompt;
  providing a first indication to the application that the particular user is authenticated in response to the inputted answer matching the correct answer; and
  providing a second indication to the application that the particular user is not authenticated in response to the inputted answer failing to match correct answer,
  wherein the application provides the particular user with access to the resource in response to the first indication, and denies the particular user access to the resource in response to the second indication.

15. The computer-implemented method of claim 13, wherein the receiving the request includes receiving the request to authenticate the particular user in response to an authentication credential inputted by the particular user to the application failing to match a stored authentication credential of the user.

16. A system, comprising:
  one or more processors; and
  memory including a plurality of computer-executable components that are executable by the one or more processors to perform a plurality of actions, the plurality of actions comprising:
  obtaining, from multiple instances of a collection application installed on multiple user devices associated with a user, user behavior data of the user that comprises at least verbal expressions of the user as captured by a user device of the multiple user devices;
  identifying, using a machine learning algorithm, a baseline behavior pattern of a user based on the user behavior data collected within a predetermined time period from the multiple user devices;
    detecting using the machine learning algorithm an event that deviates from the baseline behavior pattern of the user during a specific time period based on new user behavior data of the user obtained during the specific time period; and
    in response to receiving a request from an application to authenticate a particular user for access or continued access to a resource that includes data or a service that is provided specifically for use by the user, generating an authentication question and a correct answer for the authentication question based on a detail of the event that deviates from the baseline behavior pattern, the authentication question comprising a natural language question relating to the event that deviates from the baseline behavior pattern and the correct answer comprising the detail of the event that deviates from the baseline behavior pattern.

* * * * *